Patented Dec. 31, 1940

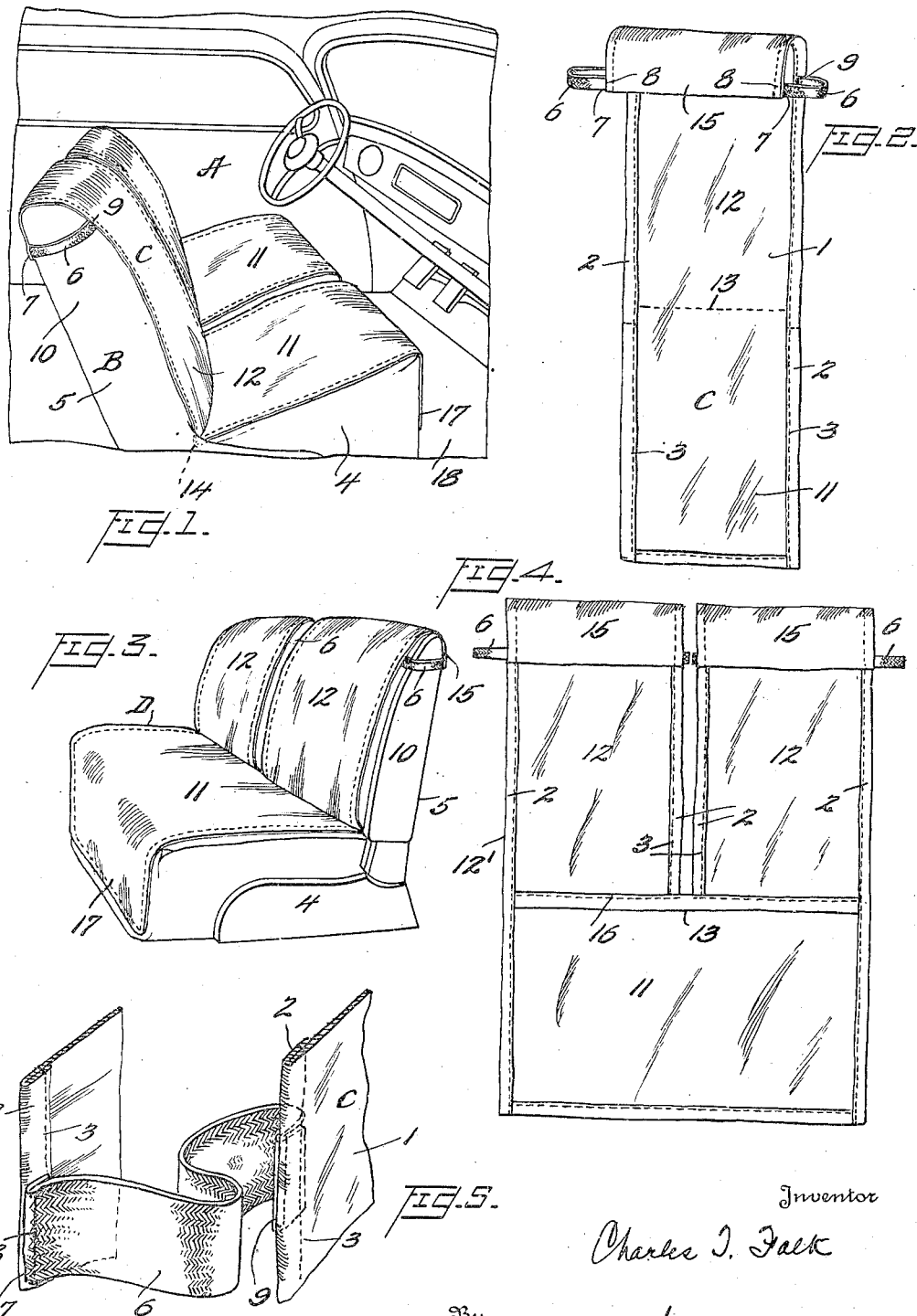

2,227,180

UNITED STATES PATENT OFFICE 2,227,180

REVERSIBLE AUTOMOBILE SEAT COVER

Charles T. Falk, Kansas City, Mo., assignor to Washable Seat Cover Company, Kansas City, Mo.

Application October 22, 1938, Serial No. 236,538

1 Claim. (Cl. 155—182)

Generically this invention relates to seat covers but it more especially is directed to the type applicable to automobile seats, and the like.

One of the principal objects of this invention is the provision of a cover for an automobile seat constituting a continuous piece of material having means at one end adapted to engage the upper end of the automobile back portion and to automatically conform to the contour of said end to prevent lateral and longitudinal displacement of said cover without regard to which surface of the cover is exposed.

An important object of this invention is the provision of a one-piece reversible automobile seat cover adapted to overlie the front and seat surfaces of an automobile seat portion and the adjacent surface of the back portion, so constructed that the upper end of said cover will embrace, be automatically adjusted with respect to the shape of and conceal the upper end of said back portion, and wherein straps and other manually operable connecting means are eliminated, thereby not only facilitating laundering and handling, but application of the cover to the seat as well.

A further important object of this invention is the provision of a removable automobile seat cover formed of a continuous piece of material adapted to overlie the front and seat portions of the automobile seat and the back and top surfaces of the adjacent automobile back portion, so constructed as to embrace and effect automatic adjustment with respect to the upper edge of the automobile back, said cover being longitudinally divided to provide individual cover portions, where the automobile back comprises individual back sections.

Another important object of this invention is the provision of an automobile seat cover having one end so constructed as to effect a snug fit and adjustably engage the upper end of the automobile back or backs irrespective of which surface of the cover is exposed without the necessity of sectional fastening elements, and the like, the construction of the cover being such as to permit its insertion between the automobile back and seat structures at their junction to provide in effect back and seat cover sections.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a fragmentary perspective view of an automobile illustrating the covers operatively positioned with respect to the automobile seats.

Fig. 2 is a rear plan view of the cover shown in Fig. 1.

Fig. 3 is a perspective view of an automobile seat construction having a single seat portion and individual back portions and illustrating the cover operatively positioned thereon.

Fig. 4 is a rear plan view of the cover shown in Fig. 3.

Fig. 5 is an enlarged detail view of one of the elastic straps.

Briefly, the seat covers heretofore in use with which I am familiar have proven deficient for several reasons, for instance, having manually operable straps or other fastening means rendering it difficult to properly secure the cover in position, presenting an unsightly appearance, expensive to manufacture, rendering laundering difficult and costly and preventing reversal of the covers, and it was to overcome such deficiencies, by providing a cover having a resilient connecting member attached at one end to the end of each respective longitudinal edge and the other end to said edge spaced from said end to effect a snug fit and automatic adjustment of the cover with the upper end of the automobile seat back portion to prevent its lateral and longitudinal displacement, at the same time eliminating unsightly straps and other attaching means, that I designed the seat cover forming the subject matter of this invention.

In the illustrated embodiment characterizing this invention there is shown an automobile body A, automobile seat B and cover C.

Where the automobile seats A comprise individual seats as shown in Fig. 1 there is employed for each seat a cover C as shown in Fig. 2, which may be formed of one piece of material 1 hemmed along its end and longitudinal edges as at 2 by stitching 3 and conforming in width to that of the automobile seat portion 4 and back portion 5.

In order to effect a means of attaching the upper end of the cover to the upper end of back B, an elastic strap 6 has one end connected to the free or upper end of cover C at its respective side edges as at 7 by folding one end of strap 6 upon itself and securing such folded portion to the end 7 of said cover by stitching 8 or in any suitable manner, the other end of the strap being secured to its respective longitudinal edge at a point spaced from the end 7 as at 9, so that when the cover is operatively positioned on the seat the straps 6 will extend horizontally across the edges 10 of back portion 5 as shown in Fig. 1.

While I have shown cover C in Fig. 2 as being constructed from a single piece of material it is to be understood that if desired said cover may be formed of two pieces of material, that is, the seat portion 11 and back portion 12 being connected by stitching or other suitable manner as at 13 without changing the one piece effect of cover C. The line of jointure 13 being so positioned that when the cover is operatively positioned it will be inserted between the jointure of seat and back structures 4 and 5 and be concealed as shown in dotted lines of Figure 1. It will be noted that the length of cover C is such as to permit insertion of a portion of the cover as indicated at 14, Fig. 1, to be tucked between the seat and back portions 4 and 5 so that the bottom end of the cover will extend over front portion 17 of seat 4 as desired and as clearly shown in Fig. 1.

It will thus be seen that by connecting straps 6 as above described the portion 15 so formed is adapted to fit over the top of back 5 and be automatically adjusted by said straps to said back, and by simply folding section 15 in the opposite direction from that shown in Fig. 2 the cover is reversed and with such reversed surface uppermost may be applied to the seat as in the first instance thereby effecting reversal of the cover as will be well understood.

The automobile seat B illustrated in Fig. 3 is similar to Fig. 1 except the seat portion 4 extends the full width of the individual back portions 5 and in this form the cover D is constructed with the seat portion 11 extended the full length of the seat and the back portion 12' is divided from the point of its junction with portion 11 longitudinally to its upper end to form the individual back sections 12 hemmed along their edges as at 2 by stitches 3 and formed with straps 6 similar to the cover described in Fig. 2, the only difference being that the adjacent hems 2 of sections 12 extend only to line 13 as shown in Fig. 4. In connection with the form shown in Fig. 4 this cover may also be constructed from a single piece of material as shown in Fig. 2 or may be constructed of two pieces of material connected as at 13 by stitching 16 or in any suitable manner.

From the above it will be noted that to apply cover C to seat B all that is necessary is to drape the cover over the seat with section 15 extended downwardly over the rear surface of back portion 5 with straps 6 extending around the outer edges 10 of said portion and by stretching the cover taut over the surface of section 5 the elastic strap 6 will effect a snug gripping fit of the upper end of the cover C with that of section 5 causing the upper housing end of said cover to conform substantially to the configuration of the top of the back which is effected by simply tucking the cover adjacent to line 13 between the back portion 5 and seat portion 4 so as to position the free end of the cover 17 over the front section and spaced with respect to floor 18 of automobile A, as desired.

It will thus be seen that the initial length of cover C may be such as to allow for shrinkage in laundering or otherwise, since the position of the bottom edge 17 with respect to floor 18 may be controlled by tucking the material adjacent line 13 between the seat and back portions 4 and 5 as will be well understood.

While I have described the cover as applied to both individual seats and a seat extending the full width of the car with individual back portions as shown in Fig. 3, it is to be understood that the cover is applicable in exactly the same manner where the back portion 5 is not divided but corresponds to the seat portion 4.

From the above it is apparent that I have designed a seat cover automatically adjustable to automobile seats and back portions of variable thicknesses or configurations and without regard to which surface of the cover is outermost, adapted to effect a saving in material, cost of production, and laundry maintenance, and whereby application and reversal of the covers with respect to the seats is readily effected without the necessity of manually operable attaching means.

Although in practice it has been found that the form of the invention illustrated in the accompanying drawing and referred to in the above description as the preferred embodiment is the most efficient and practical; yet realizing the conditions concurrent with the adoption of the invention will necessarily vary, I desire to emphasize that various minor changes in details of construction, proportion and arrangement of parts, may be resorted to within the scope of the appended claim without departing from or sacrificing any of the principles of this invention.

Having thus described my invention, what I desire protected by Letters Patent is as set forth in the following claim.

A reversible continuous piece automobile seat cover of a length sufficient to provide seat and back portions and an intermediate foldable portion adapted to be inserted between the meeting edges of the back and seat portions of an automobile seat, the back portion being divided longitudinally with respect to said cover to form individual back portions, a pair of straps attached to each of the back portions, one extremity of each strap being connected to and adjacent the upper end of its respective back portion at its longitudinal edge and the other end attached to said edge at a point spaced from the attached end, whereby the upper ends of the back portions will be drawn into gripping engagement with and automatically conform to the upper ends of the underlying automobile seat backs to maintain said cover against longitudinal and lateral displacement without regard to which surface of the cover is outermost when said intermediate portion has been inserted sufficiently between and frictionally engaged by the meeting edges of the back and seat portions of the automobile seat.

CHARLES T. FALK.